(12) United States Patent
Balland-Longeau et al.

(10) Patent No.: US 7,868,124 B2
(45) Date of Patent: Jan. 11, 2011

(54) POLYPHENYLENE-TYPE POLYMERS, PREPARATION METHOD THEREOF, MEMBRANES AND FUEL CELL DEVICE COMPRISING SAID MEMBRANES

(75) Inventors: Alexia Balland-Longeau, Tours (FR); Franck Pereira, Tours (FR); Philippe Capron, Luzinay (FR); Regis Mercier, Irigny (FR)

(73) Assignee: Commissariat a l'Engergie Atomique, Paris (FR)

( * ) Notice: Subject to any disclaimer, the term of this patent is extended or adjusted under 35 U.S.C. 154(b) by 317 days.

(21) Appl. No.: 10/523,642

(22) PCT Filed: Aug. 4, 2003

(86) PCT No.: PCT/FR03/02455

§ 371 (c)(1), (2), (4) Date: Nov. 17, 2005

(87) PCT Pub. No.: WO2004/014981

PCT Pub. Date: Feb. 19, 2004

(65) Prior Publication Data

US 2006/0106190 A1 May 18, 2006

(30) Foreign Application Priority Data

Aug. 6, 2002 (FR) .................. 02 10008

(51) Int. Cl.
| | |
|---|---|
| C08G 2/00 | (2006.01) |
| C08G 4/00 | (2006.01) |
| C08G 6/00 | (2006.01) |
| C08G 10/00 | (2006.01) |
| C08G 12/00 | (2006.01) |
| C08G 14/00 | (2006.01) |
| C08G 16/00 | (2006.01) |
| C08G 75/00 | (2006.01) |
| B01J 49/00 | (2006.01) |
| C08J 5/20 | (2006.01) |

(52) U.S. Cl. ............................ 528/220; 528/391; 521/27
(58) Field of Classification Search .................... 528/86, 528/220, 391; 521/27
See application file for complete search history.

(56) References Cited

U.S. PATENT DOCUMENTS

| | | | | |
|---|---|---|---|---|
| 3,816,373 A | * | 6/1974 | Hoogeboom | 528/196 |
| 4,657,990 A | * | 4/1987 | Daoust et al. | 525/471 |
| 5,081,214 A | * | 1/1992 | Schneller | 528/125 |
| 5,109,110 A | * | 4/1992 | Ogata et al. | 528/388 |
| 5,254,223 A | * | 10/1993 | Josowicz et al. | 205/419 |
| 5,403,675 A | | 4/1995 | Ogata et al. | |
| 5,668,245 A | | 9/1997 | Marrocco et al. | |
| 5,789,521 A | * | 8/1998 | Marrocco et al. | 528/125 |
| 6,025,092 A | * | 2/2000 | Doyle et al. | 429/213 |
| 6,069,223 A | * | 5/2000 | Liggat et al. | 528/171 |
| 6,242,123 B1 | * | 6/2001 | Nezu et al. | 429/33 |
| 6,743,861 B1 | * | 6/2004 | Matsumoto et al. | 525/89 |
| 6,790,931 B2 | * | 9/2004 | Cui et al. | 528/373 |
| 6,902,801 B2 | * | 6/2005 | Charnock et al. | 428/320.2 |
| 2002/0045085 A1 | * | 4/2002 | Formato et al. | 429/33 |
| 2002/0064680 A1 | * | 5/2002 | Spreitzer et al. | 428/690 |
| 2003/0078363 A1 | * | 4/2003 | Guo et al. | 528/86 |
| 2003/0104259 A1 | * | 6/2003 | Oguri et al. | 429/33 |
| 2003/0129467 A1 | * | 7/2003 | Morishima et al. | 429/33 |
| 2004/0110051 A1 | * | 6/2004 | Srinivas | 429/33 |
| 2004/0162362 A9 | * | 8/2004 | Armand et al. | 522/31 |
| 2006/0166046 A1 | * | 7/2006 | Dubitsky et al. | 429/12 |

FOREIGN PATENT DOCUMENTS

| | | |
|---|---|---|
| DE | 195 35 086 | 3/1997 |
| EP | 0 773 248 | 5/1997 |
| WO | WO 8912390 A1 * | 12/1989 |
| WO | WO 94/24717 | 10/1994 |
| WO | WO 96/28491 | 9/1996 |
| WO | WO 98/55534 | 12/1998 |
| WO | WO 0142336 A1 * | 6/2001 |
| WO | WO 0170858 A2 * | 9/2001 |

OTHER PUBLICATIONS

Bloom and Sheares (Macromolecules 2001, 34, 1627-1633).*
Ghassemi et al., Polymer, 2004, 5847-5854.*
Colon et al. "Coupling of Aryl Chlorides by Nickel and Reducing Metals" *J. Org. Chem.* 51:2627-2637 (1986).
Pasquale et al. "Poly (*p*-phenylene) Derivatives via Ni-Catalyzed Coupling of Aromatic Dichlorides" *Polymer Preprints* 38(1):170-171.
Bloom et al. Functional Derivatives of Poly(4'-Fluoro-2,5-Diphenylsulfone) Via Nucleophilic Aromatic Substitution *Polymer Preprints, ACS* 40(2):567-568.
Takahashi et al. "Preparation of curable polyarylenes bearing sulfonic acid for proton-conductive membranes" Chemical Abstract XP002241914—Database accession No. 135:304937.

* cited by examiner

*Primary Examiner*—Mark Eashoo
*Assistant Examiner*—Liam J Heincer
(74) *Attorney, Agent, or Firm*—McKenna Long & Aldridge LLP

(57) ABSTRACT

The present invention relates to polymers comprising phenylene units, at least one of which bears a phenylene side group substituted with a perfluoro group or chain, which itself bears an —$SO_3H$, —$PO_3H_2$ or —$CO_2H$ group.

Use of this polymer to make fuel cell membranes.

14 Claims, No Drawings

POLYPHENYLENE-TYPE POLYMERS, PREPARATION METHOD THEREOF, MEMBRANES AND FUEL CELL DEVICE COMPRISING SAID MEMBRANES

This application is a national phase application of PCT Application No. PCT/FR2003/002455, filed Aug. 4, 2003, which claims the benefit of French Patent Application No. 02/10008, filed Aug. 6, 2002, which are both hereby incorporated by reference.

TECHNICAL FIELD

The present invention relates to polymers comprising phenylene repeating units bearing perfluoro ionic groups, and to the process for preparing them.

These polymers, which have excellent physicochemical properties, such as proton conductivity and chemical stability, in particular find their application in the preparation of ion-exchange membranes, intended for fuel cells operating at high temperature, up to temperatures in the region of 140 to 160° C.

Consequently, the field of the invention is also that of membranes prepared with said polymers and solid electrolyte fuel cell devices comprising at least one of these membranes.

The field of the invention may be defined as that of fuel cells, and more particularly of fuel cells having a membrane as electrolyte, such as PEMFC cells ("Proton Exchange Membrane Fuel Cells") and DMFC cells ("Direct Methanol Fuel Cells").

PRIOR ART

A fuel cell generally comprises a stack of elemental cells, within which takes place an electrochemical reaction between two reagents that are introduced continuously. The fuel, such as hydrogen, for the cells operating with hydrogen/oxygen mixtures, or methanol for cells operating with methanol/oxygen mixtures, is brought into contact with the anode, whereas the oxidant, generally oxygen, is brought into contact with the cathode. The anode and the cathode are separated by an electrolyte, of ion-exchange membrane type. The electrochemical reaction, the energy of which is converted into electrical energy, is composed of two half-reactions:

- an oxidation of the fuel, which takes place at the anode/electrolyte interface, producing, in the case of hydrogen cells, protons $H^+$, which cross the electrolyte in the direction of the cathode, and electrons, which rejoin the outer circuit, in order to contribute to the production of electrical energy;
- a reduction of the oxidant, which takes place at the electrolyte/cathode interface, with production of water, in the case of hydrogen cells.

The electrochemical reaction takes place, strictly speaking, on an electrode-membrane-electrode assembly.

The electrode-membrane-electrode assembly is a very thin assembly, of about one millimeter thick, and each electrode is fed from the rear, with gasses, for example using a corrugated plate.

The power densities obtained by such an assembly, which are generally from about 0.5 to 2 $W/cm^2$ in the case where hydrogen and oxygen are used, require the combination of several of these electrode-membrane-electrode assemblies in order to obtain, for example, the 50 kW necessary for a standard electric vehicle.

In other words, it is necessary to assemble a large number of these assemblies, the elemental surface areas of which may be about 20×20 $cm^2$, to obtain the desired power, especially in the case where the fuel cell is used in an electric vehicle.

With this aim, each assembly formed from two electrodes and from one membrane, defining an elemental cell of the fuel cell, is thus arranged between two leaktight plates which, firstly, ensure the distribution of hydrogen, on the anode side, and, secondly, of oxygen on the cathode side. These plates are known as bipolar plates.

The ion-conducting membrane is generally an organic membrane containing ionic groups which, in the presence of water, allow the conduction of the protons produced at the anode by oxidation of the hydrogen.

The thickness of this membrane is generally between 50 and 150 µm and results from a compromise between the mechanical strength and the ohmic loss. This membrane also allows the separation of the gasses. The chemical and electrochemical resistance of these membranes generally allows the cell to run for periods of more than 1000 hours.

The polymer constituting the membrane must thus satisfy a certain number of conditions relating to its mechanical, physicochemical and electrical properties, which are, inter alia, those defined below.

The polymer must firstly be able to give defect-free, dense, thin films, of 50 to 100 micrometers. The mechanical properties, modulus of elasticity, breaking stress and ductility, must make it compatible with the assembly operations comprising, for example, gripping between metal frames.

The properties must be preserved on passing from the dry state to the wet state.

The polymer must have good thermal stability to hydrolysis and must show good resistance to reduction and to oxidation up to temperatures in the region of 200° C. This thermomechanical stability is assessed in terms of the variation in ionic strength, and in terms of variation of the mechanical properties.

Finally, the polymer must have high ionic conductivity; this conductivity is provided by strong acid groups, such as phosphoric acid groups, but above all sulfonic acid groups, linked to the chain of the polymer. As a result, these polymers will generally be defined by their equivalent mass, i.e. the weight of polymer in grams per acid equivalent.

By way of example, the best systems currently developed are capable of providing a specific power of 1 $W \cdot cm^2$, i.e. a current density of 2 $A \cdot cm^{-2}$ for 0.5 volts.

Various types of proton-conducting polymers that may be used to make fuel cell membranes have been proposed for several decades.

Resins of sulfonated phenolic type prepared by sulfonation of polycondensed products, such as phenolformaldehyde polymers, were first used.

The membranes prepared with these products are inexpensive, but do not have sufficient stability to hydrogen at 50-60° C. for long-lasting applications.

Attention then turned toward sulfonated polystyrene derivatives, which are of higher stability than sulfonated phenolic resins, but cannot be used above 50-60° C.

The most advantageous performance qualities are currently obtained with polymers consisting of a perfluoro linear main chain and a side chain bearing a sulfonic acid group.

Among the best known of these polymers, which are commercially available, mention may be made of the polymers registered under the brand names Nafion® from the company Dupont de Nemours, Aciplex® from the company Asahi Chemical, or Flemion® and Dow® from the company Dow Chemical.

These polymers have excellent electrochemical properties on account of their high proton conductivity, and good chemical stability. Their properties are stable up to about 90-100° C. for several thousand hours. Under such working conditions, the phenomena of ageing are negligible. On the other hand, in the event of a very large scale manufacture, these polymers are unsuitable, especially for the motor vehicle industry, on account of their very high cost, which is about 800 euros/m².

Moreover, the sensitivity to alcohols, known as the crossover phenomenon, and to temperatures of greater than 100° C. of polymers of this type excludes them from the field of application of direct methanol cells operating at high temperature, i.e. between 100 and 150° C.

In order to reduce the costs, to improve the chemical stability, to increase the operating temperatures and to improve the durability of the systems under the working conditions, numerous studies have been undertaken over the last 10 years, regarding the development of solid polymer electrolytes having a hydrocarbon-based skeleton. Specifically, these polymers with a hydrocarbon-based structure have many advantages (good chemical stability, advantageous mechanical properties and readily modulable high thermal properties). In most cases, they are commercial polymers, such as polyether ketones, polyether sulfones, polybenzimidazoles, or aromatic polymers such as polystyrene. In order to give them the expected properties especially in terms of proton conductivity, these polymers are usually modified by "post-sulfonation" using strong acids (sulfuric acid, fuming sulfuric acid or chlorosulfonic acid) or by irradiation grafting. This type of synthetic process is simple and inexpensive.

International patent application WO 94/24717 [1] illustrates this approach perfectly. These documents concern, firstly, the synthesis of polyparaphenylenes substituted by a coupling reaction of Colon type, and secondly the post-sulfonation of these polymers for use in the form of membranes. The polymers obtained via the methods outlined in these documents are stable up to 100° C. and have advantageous proton conductivities. On the other hand, no control of the post-sulfonation step is possible. Specifically, in general, this method does not make it possible to control the level of sulfonic functions introduced and their distribution on the initial carbon-based skeleton. As a result, it is difficult to control both the proton conductivity, the chemical and thermal stability, and then the sensitivity to ageing phenomena in a fuel cell. Furthermore, appreciable degradation of the base polymer skeleton may be noted in certain cases, which is associated with harsh post-sulfonation conditions, such as the use of very strong acids and high temperatures.

Other polymers with a hydrocarbon-based skeleton have been described in documents U.S. Pat. No. 5,668,245 [2] and EP-A-0 723 248 [3]. These polymers consist of a skeleton comprising arylene repeating units, such as para-phenylene units, substituted with sulfonated heterocyclic groups.

The preparation of polymers of this type consists in copolymerizing one or more nonsulfonated aromatic monomers with a monomer bearing a sulfonated heterocyclic group. The aromatic structure of the skeleton of these polymers contributes toward good chemical stability of said polymers. The heterocyclic side groups borne in certain places on the polymer skeleton give these polymers high solubility in organic solvents such as N-methylpyrrolidone and N,N-dimethylformamide and may thus be formed into membranes. These heterocyclic groups may moreover be protonated with standard acids, which imparts advantageous proton conductivity. However, the bond between the heterocycle and the acid is reversible and the properties of polymers of this type are not stable over a long period and under the working conditions of a fuel cell.

German patent application DE-A1-195 35 086 [4] describes copolymers consisting of copolyphenylenes substituted with various groups bearing sulfonic functions. Two preparation methods are proposed for gaining access to copolymers of this type in said document.

A first method consists in performing a step of post-sulfonation of polymers consisting of a skeleton of polyphenylene type.

A second method consists in copolymerizing standard aromatic monomers with monomers bearing sulfonic groups. This method especially requires the use of a coupling reaction of Suzuki type, in aqueous medium and in the presence of palladium catalysts. This approach is relatively advantageous, since it allows the amount of functions introduced into the final copolymers to be controlled easily and thus allows the targeted properties (morphology, proton conductivity and chemical and thermal stability) to be controlled more easily. On the other hand, this technique is relatively expensive to perform.

There is thus still a need for a proton-conducting polymer, which does not have the drawbacks of the prior art, which has excellent chemical and thermal stability, which contains ionic groups whose content, localization and distribution are perfectly controlled, and which satisfy the following conditions:

ionic (proton) conductivity of between $5 \times 10^{-3}$ and $10^{-2}$ S·cm$^{-1}$;

high resistance to acid hydrolysis in oxidizing medium up to temperatures in the region of 150° C.;

resistance to the working conditions within the fuel cell device;

low methanol permeation, in the case of a direct methanol cell;

thermomechanical stability up to temperatures in the region of 200° C.;

low permeation to gasses and especially to hydrogen and oxygen, for hydrogen/air cells;

solubility in common organic solvents;

ability to be used in the form of a thin film.

DESCRIPTION OF THE INVENTION

This combination of needs is achieved, in accordance with the invention, by a polymer, the skeleton of which consists of at least one phenylene repeating unit of formula (I) below:

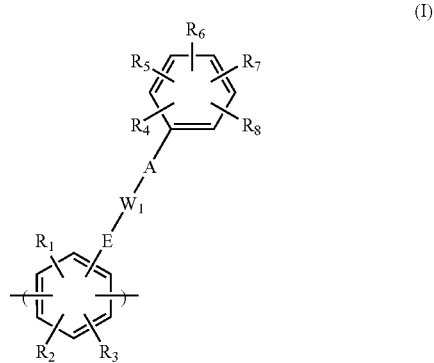

and of at least one phenylene repeating unit of formula (II) below:

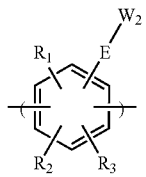

(II)

in which:
- the groups $R_1$, $R_2$ and $R_3$, which may be identical or different, represent a hydrogen atom, a halogen atom, an alkyl group, an aryl group, a perfluoroalkyl group or a perfluoroaryl group;
- the group E represents a single bond or a group chosen from —(C=O)—, —P(=O)— and —SO$_2$—;
- the group $W_1$ represents an arylene group or a perfluoroarylene group;
- the group A represents a group chosen from —O—, —S—, —NH— and —NR$_9$—, $R_9$ being an alkyl group;
- the group $W_2$ represents an aryl group substituted with at least one substituent chosen from F, —O—SO$_2$-Aryl, —S(=O)-Aryl or represents a perfluoroaryl group;
- the groups $R_4$, $R_5$, $R_6$, $R_7$ and $R_8$, which may be identical or different, represent a group chosen from:
  - a hydrogen atom, a halogen atom, an —OH group, a group -M($R_{10}$)$_3$ with $R_{10}$ representing an alkyl group and M a metal chosen from Si, Sn and Ge;
  - a group —P(=O) (OR$_{11}$)$_2$ with $R_{11}$ representing an alkyl group;
  - an aryl group, a group —O-Aryl, a group —SO$_2$-aryl, an alkylaryl group, a perfluoroalkyl group or a perfluoroalkylaryl group, said alkyl, perfluoroalkyl and perfluoroalkylaryl groups optionally comprising in their chain one or more oxygen, nitrogen and/or sulfur atoms;
  - a perfluoroaryl group or a group —O-perfluoroaryl, said perfluoroalkyl, perfluoroaryl, perfluoroalkylaryl and —O-perfluoroaryl groups optionally bearing a group chosen from —SO$_3$H, —PO$_3$H$_2$ and —CO$_2$H;
  - an —SO$_3$H group, a —PO$_3$H$_2$ group or a —CO$_2$H group;

on condition that at least one of the groups $R_4$, $R_5$, $R_6$, $R_7$ and $R_8$ represents a group chosen from —SO$_3$H, —PO$_3$H$_2$ and —CO$_2$H groups, perfluoroalkyl groups, perfluoroalkylaryl groups optionally comprising in their chain one or more oxygen, nitrogen and/or sulfur atoms, perfluoroaryl groups and —O-perfluoroaryl groups, these perfluoro groups bearing a group chosen from —SO$_3$H, —PO$_3$H$_2$ and —CO$_2$H, said —SO$_3$H, —PO$_3$H$_2$ and —CO$_2$H groups possibly being in the form of alkali metal salts.

Before going into further detail in the description, the following definitions are presented.

According to the invention, the term "halogen atom" means an atom chosen from fluorine, chlorine, bromine and iodine.

According to the invention in the text hereinabove and hereinbelow, the term "alkyl group" means a linear or branched alkyl group of 1 to 20 carbon atoms or a cyclic group of 3 to 20 carbon atoms. Among these groups, mention may be made of methyl, ethyl, n-propyl, i-propyl, n-butyl, n-dodecyl, i-butyl, t-butyl, cyclopropyl and cyclohexyl groups. These groups may comprise in their chain one or more groups chosen from O, S and/or N.

According to the invention in the text hereinabove and hereinbelow, the term "aryl group" means an aromatic carbon-based group containing from 6 to 20 carbon atoms. Among these groups, mention may be made of benzyl, naphthyl, tolyl and biphenyl groups.

The term "arylene group" means an aryl group (as defined above) forming a bridge between two groups, i.e. two hydrogens which are replaced to form said bridge.

According to the invention in the text hereinabove and hereinbelow, the term "alkylaryl group" means an aryl group of the same definition as that given above, said group being substituted with at least one alkyl chain, which may comprise one or more O, N and/or S atoms.

The terms "—O-aryl group" and "—SO$_2$-aryl group" mean an aryl group, of the same definition as that given above, the aryl groups being in this case linked to other groups via an oxygen atom or a sulfonyl group —SO$_2$—.

The terms "perfluoroalkyl group", "perfluoroaryl group", "—O-perfluoroaryl group", "perfluoroalkylaryl group" and "perfluoroarylene group" mean groups whose hydrogen atoms are totally replaced with fluorine atoms (the alkyls, aryls, alkylenes and arylenes corresponding to the same definition as that given above). For example, mention may be made of trifluoromethyl —CF$_3$, perfluoroethyl, perfluorobutyl, perfluoropropyl, perfluoropentyl, perfluorophenyl $C_6F_5$—, perfluorobiphenyl and perfluorobenzyl.

The term "alkali metal salt" means salts corresponding to the formulae —SO$_3$Y, —PO$_3$Y$_2$ and —CO$_2$Y with Y being a metal chosen from Na, K and Li.

The term "single bond" means a single covalent bond forming a bridge between the phenyl group bearing $R_1$, $R_2$, $R_3$ and the group $W_1$ or $W_2$ according to the phenylene unit under consideration.

The polymer according to the invention is a copolymer that may consist of one or more repeating units of formula (I) and of one or more repeating units of formula (II).

Due to the fact that it has a skeleton consisting of these phenylene units, the polymer in accordance with the invention has the physical, chemical, mechanical and thermal qualities inherent to this type of structure.

By virtue of the presence of acid groups —SO$_3$H, —PO$_3$H$_2$ or —CO$_2$H and of the combination of units of the formulae (I) and (II), these polymers have good proton conductivity and good ion-exchange capacity, this capacity possibly being greater than 1 meq/g and preferably from 1.2 to 1.7 meq/g. Furthermore, these polymers have an excellent capacity to be formed into thin films. All these abovementioned characteristics contribute toward making these polymers particularly advantageous for incorporation into the constitution of membranes.

Furthermore, the fact that the skeleton of the polymer consists of at least one phenylene repeating unit in accordance with the formula (I) and of at least one repeating unit of formula (II), contributes toward reducing the pKa of these polymers compared with standard polymers of the prior art (the reduction in pKa contributing toward increasing the acidity of the —SO$_3$H, —PO$_3$H$_2$ or —CO$_2$H functions). These polymers may be used as membranes in fuel cell devices operating at high temperature.

The molecular weight of the polymer according to the invention is generally greater than or equal to 50 000 and preferably from 50 000 to 150 000.

The polymer in accordance with the invention may be a random, alternating or sequential polymer. For each of these possibilities, the molar percentage of each of the repeating units may vary while being fully defined.

Thus, the polymer according to the invention may comprise from 40 to 50 mol % of the repeating unit(s) (I) and from 60 to 50 mol % of the repeating unit(s) (II).

According to the invention, the phenylene groups constituting the skeleton of the polymer may be, relative to each other, in the ortho form (1,2-phenylene), the meta form (1,3-phenylene) or the para form (1,4-phenylene).

Preferably, the phenylene groups of the skeleton are in the para position relative to each other, i.e. these units correspond to the following formulae:

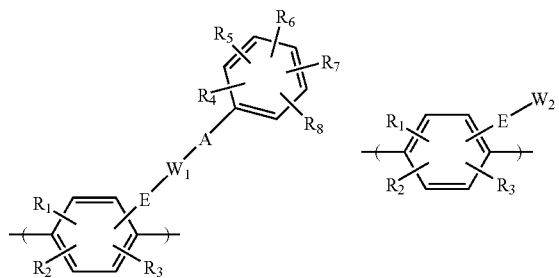

According to the invention, the groups E and A borne by $W_1$ may be in the ortho, meta and para positions relative to each other.

The groups $R_1$, $R_2$ and $R_3$ borne by the phenylenes of the units of formulae (I) and (II), which may be identical or different, represent a hydrogen atom, a halogen atom, an alkyl group, an aryl group, a perfluoroalkyl group or a perfluoroaryl group.

The group $W_1$ forming the junction between the phenylenes of the unit of formula (I) forming the skeleton of the polymer and the phenylene side group may be an arylene group or a perfluoroarylene group.

The groups $R_4$, $R_5$, $R_6$, $R_7$ and $R_8$, which may be identical or different, represent a group chosen from:
- a hydrogen atom, a halogen atom, an —OH group, a group -M($R_{10}$)$_3$ with $R_{10}$ representing an alkyl group and M a metal chosen from Si, Sn and Ge;
- a group —P(=O) (O$R_{11}$)$_2$ with $R_{11}$ representing an alkyl group;
- an aryl group, a group —O-Aryl, a group —SO$_2$-aryl, an alkylaryl group, a perfluoroalkyl group or a perfluoroalkylaryl group, said alkyl, perfluoroalkyl and perfluoroalkylaryl groups optionally comprising in their chain one or more oxygen, nitrogen and/or sulfur atoms;
- a perfluoroaryl group or a group —O-perfluoroaryl, said perfluoroalkyl, perfluoroaryl, perfluoroalkylaryl and —O-perfluoroaryl groups optionally bearing a group chosen from —SO$_3$H, —PO$_3$H$_2$ and —CO$_2$H;
- an —SO$_3$H group, a —PO$_3$H$_2$ group or a —CO$_2$H group;

on condition that at least one of the groups $R_4$, $R_5$, $R_6$, $R_7$ and $R_8$ represents a group chosen from —SO$_3$H, —PO$_3$H$_2$ and —CO$_2$H groups, perfluoroalkyl groups, perfluoroalkylaryl groups optionally comprising in their chain one or more oxygen, nitrogen and/or sulfur atoms, perfluoroaryl groups and —O-perfluoroaryl groups, these perfluoro groups bearing a group chosen from —SO$_3$H, —PO$_3$H$_2$ and —CO$_2$H, said —SO$_3$H, —PO$_3$H$_2$ and —CO$_2$H groups possibly being in the form of alkali metal salts.

Thus, at least one of the groups $R_4$, $R_5$, $R_6$, $R_7$ and $R_8$ should represent an —SO$_3$H, —PO$_3$H$_2$ or —CO$_2$H group borne directly on the ring or at least one of the groups $R_4$, $R_5$, $R_6$, $R_7$ or $R_8$ should represent a perfluoroalkyl, perfluoroalkylaryl (the perfluoroalkyl group and the perfluoroalkylaryl group possibly comprising in their chain one or more oxygen, nitrogen and/or sulfur atoms), perfluoroaryl or —O-perfluoroaryl group borne directly on the ring, these perfluoro groups (i.e. the perfluoroalkyl, perfluoroalkylaryl, perfluoroaryl or O-perfluoroaryl groups) bearing a group chosen from —SO$_3$H, —PO$_3$H$_2$ and —CO$_2$H.

Preferably, at least one of the groups $R_4$, $R_5$, $R_6$, $R_7$ and $R_8$ represents a perfluoroalkyl group bearing in its chain one or more oxygen, nitrogen and/or sulfur atoms, said group bearing a group chosen from —SO$_3$H, —PO$_3$H$_2$ and —CO$_2$H or the alkali metal salts.

Thus, by means of this preferred mode, access is gained to polymers having very low pKa values (which may have negative values), which reinforces the capacity of these polymers to conduct protons.

In the unit of formula (II), the group $W_2$ represents an aryl group substituted with at least one substituent chosen from F, —O—SO$_2$-Aryl and —S(=O)-Aryl or represents a perfluoroaryl group.

An example of a group $W_2$ that may be mentioned is the group having the following formula:

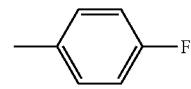

It is noted that different repeating units of formula (I) and different repeating units of formula (II) may coexist in the polymers according to the invention, the proportion of which units may be adjusted.

One particular family in accordance with the present invention corresponds to a family of polymers in which, for the repeating unit(s) of formula (I), at least one of the groups $R_4$, $R_5$, $R_6$, $R_7$ and $R_8$ represents a group chosen from —SO$_3$H, —PO$_3$H$_2$ and —CO$_2$H, and, for the unit(s) of formula (II), $W_2$ is an aryl group bearing a fluorine substituent.

Particular polymers belonging to the family defined above are those, for example, whose skeleton consists of units in accordance with formulae (I) and (II) above, corresponding to formulae (Ia) and (IIa) below:

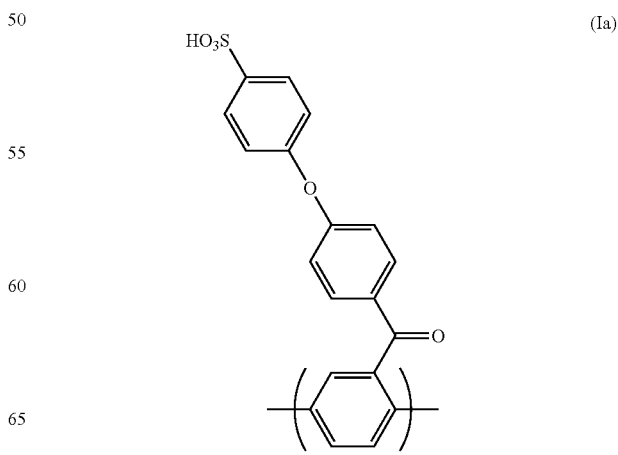

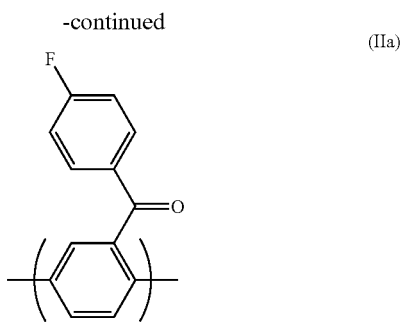

Another family in accordance with the present invention corresponds to the family in which, for the units of formula (I), at least one of the groups $R_4$, $R_5$, $R_6$, $R_7$ and $R_8$ represents a perfluoroalkyl group chosen from the groups having the following formulae: $—(CF_2)_n—O—(CF_2)_n—SO_3H$, $—(CF_2)_n—SO_3H$, $—O—(CF_2)_n—SO_3H$, $—O—(CF_2)_n—O—(CF_2)_n—SO_3H$, n ranging from 1 to 10, and, for the units of formula (II), $W_2$ represents an aryl group bearing a fluorine atom.

Particular polymers belonging to the family defined above are those, for example, whose skeleton consists of units in accordance with formulae (I) and (II), corresponding to formulae (Ib) and (IIa) below:

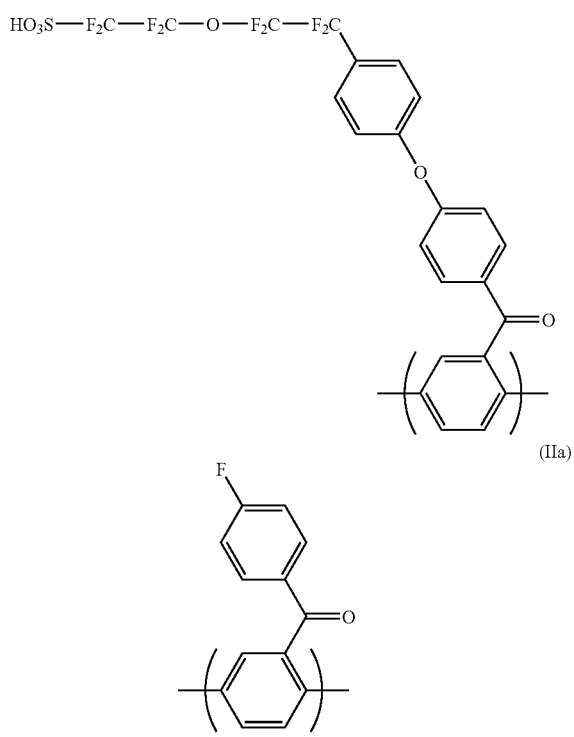

This family of polymers is particularly advantageous especially due to the fact that the acid group is borne by a perfluoroalkyl chain, which contributes toward further reducing the pKa relative to the family described above, and also toward increasing their ion conductivity.

The polymers in accordance with the present invention may be prepared by any type of process known to those skilled in the art.

In particular, the polymers in accordance with the present invention may be prepared via a process comprising the reaction of a base polymer whose skeleton consists of at least one repeating unit of formula (II) below:

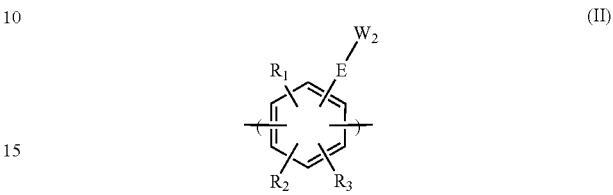

in which the groups $R_1$, $R_2$, $R_3$, $W_2$ and E correspond to the same definition as that given above, with at least one compound of formula (III) below:

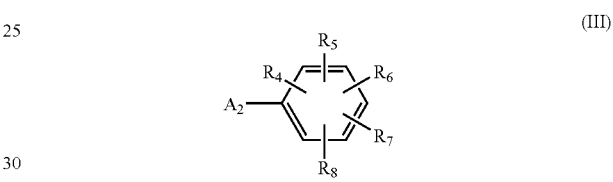

in which the groups $R_4$, $R_5$, $R_6$, $R_7$ and $R_8$ are as defined above, the group $A_2$ is an OH, $NH_2$, NHR or SH group capable of effecting the nucleophilic substitution of a group borne by $W_2$, this group possibly being an F, $—O—SO_2$-Aryl or $—S(=O)$-Aryl group. It is noted that R corresponds to the same definition as $R_9$ given above.

It is noted that, according to the invention, the reaction of the compound of formula (III) (preferably in the form of the alkaline salt of $—SO_3H$, $—PO_3H_2$ or $—CO_2H$) with the unit of formula (II) makes it possible to obtain a unit of formula (I). The polymer obtained after this reaction (preferably incomplete for steric reasons) will comprise both one or more units of formula (I) and one or more units of formula (II) (derived from the unreacted units of the base polymer). The polymer will comprise different units of formula (I) when:
 the base polymer consists of different units of formula (II) and/or
 the reaction is performed with different compounds of formula (III).

For this process, the functionalized polyphenylene used as starting material comprises a group (borne in this case by $W_2$) that is capable of being substituted with a nucleophilic group during a nucleophilic substitution, this group capable of being substituted possibly being an F, $—SO_2$-aryl or $—SO$-aryl group.

This process is particularly advantageous since it makes it possible to control the degree of substitution of the base polymer with the compounds of formula (III), and consequently the degree of introduction of the functions of $—SO_3H$, $—PO_3H_2$ or $—CO_2H$ type (or in alkaline salt form) and makes it possible to introduce various types of unit of formula (I). Furthermore, this process is easy to perform.

The compounds (III) may be directly commercially available or indirectly available in the form of intermediates, for example —SO$_2$F intermediates, thus needing to be treated by means of an acid hydrolysis pretreatment.

The base polymers used in the context of this process may be commercial polymers or polymers synthesized for the reaction.

Such polymers may be obtained from monomers of formula:

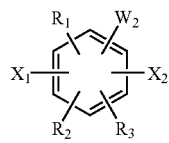

X$_1$ and X$_2$ preferably representing halogen atoms, preferably chlorine or bromine, or sulfonates such as mesylates —O—SO$_2$—CH$_3$. These monomers may be preferably polymerized using a catalytic mixture of an anhydrous nickel salt, preferably a halide, such as NiCl$_2$, and of triphenylphosphine in the presence of a reductive metal preferably chosen from Zn, Mg and Mn. Preferably, bipyridine may be used as initiator and a polar aprotic solvent such as N-methylpyrrolidone, dimethylformamide or dimethyl sulfoxide may be used.

By way of example, a polymer serving as base polymer to make a polymer of the invention is poly(4'-fluoro-2,5-benzophenone). In the case of this polymer, an additional oxidation step may be envisioned.

This polymer may be prepared according to the following reaction scheme:

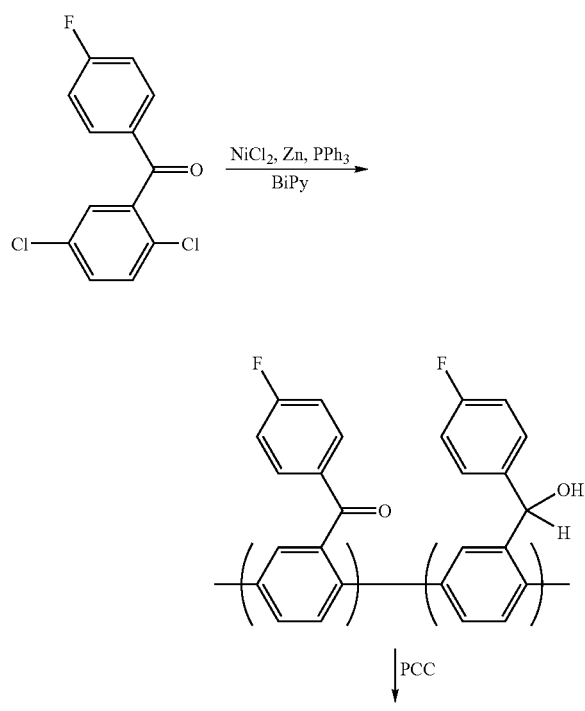

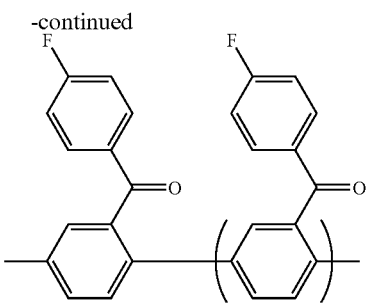

PCC corresponding to the oxidizing agent pyridinium chloroformate.

These processes for obtaining base polymers are described especially in the document "coupling of aryl chlorides by nickel and reducing metals" by I. Colon and D. R. Kelsey, I. Org. Chem., 1986, 51, pp. 2627-2637 [5], to which reference may be made.

Next, the base polymer, comprising on each of its repeating units a substituent, for example of the fluorine type, undergoes an aromatic nucleophilic substitution reaction with at least one suitable compound of formula (III) comprising the appropriate groups R$_4$, R$_5$, R$_6$, R$_7$ and R$_8$ and said group A$_2$.

Due to the fact that the substitutable group borne on the aromatic ring constituting W$_2$ is chosen as a function of its ability to be readily substituted, the aromatic substitution reaction may be performed under very mild synthetic conditions in a polar aprotic medium. This preparation process also allows total control of the position and distribution of the organic molecule grafted onto the base polymer.

In detail, the process generally commences by purifying all the reagents used in the reaction in order to remove any traces of impurities liable to modify the nature of the polymer obtained.

The reaction is performed in containers under inert atmosphere, for example a reactor equipped with an argon flush, optionally equipped with Dean-Stark apparatus, said Dean-Stark apparatus allowing the removal of the water formed during the formation of the anion of compound (III).

In a first stage, the process may commence by introducing into the reactor under argon a mild base, such as sodium carbonate, followed by an aprotic solvent or a mixture of aprotic solvents, such as a mixture of dimethylacetamide and toluene.

The compound of formula (III) may then be introduced, followed by heating to a temperature ranging from 100 to 145° C. for a period of 1 to 4 hours. Next, the polymer comprising a repeating unit of formula (II) is introduced and the reaction mixture is maintained at a temperature of 100 to 150° C. for a time, for example, of 24 hours.

The reaction mixture is then precipitated by adding distilled water, and is then left to stir. The polymer precipitate obtained is then separated out, for example by filtration on a Büchner funnel.

By adjusting the operating conditions outlined above, the process according to the invention can lead to the formation of a random, sequential or alternating polymer.

Due to the ion-exchange capacities and the chemical stability of the polymers of the invention and also their solubility in organic solvents such as N-methylpyrrolidone, dimethylformamide, dimethyl sulfoxide or dimethylacetamide, these polymers all have properties for being formed into membranes. Specifically, the polymers of the present invention have a high ion-exchange capacity and an ion (proton) conductivity of between $5 \times 10^{-3}$ and $10^{-2}$ S·cm$^{-1}$.

A subject of the invention is thus also a membrane comprising at least one polymer according to the invention.

The membranes according to the invention may be prepared via methods of any type known to those skilled in the art.

In particular, these membranes may be prepared, for example, by pouring the polymer predissolved in a solvent such as N-methylpyrrolidone, dimethylformamide, dimethyl sulfoxide or dimethylacetamide onto a plate, and the deposited polymer is then dried so as to obtain a film from 50 to 100 µm thick, and is then detached from the plate.

Owing to the polymer from which the membranes according to the invention are made, these membranes have high resistance to acid hydrolysis in oxidizing medium up to temperatures in the region of 150° C., a thermomechanical stability up to temperatures in the region of 200° C., and low permeation to methanol and to gasses, in particular to hydrogen and oxygen.

All these conditions are those involved in the running of a fuel cell, and especially hydrogen/air or methanol/air cells operating at high temperature.

Thus, a subject of the invention is also a fuel cell device comprising at least one membrane comprising a polymer according to the invention.

This device comprises one or more electrode-membrane-electrode assemblies.

To prepare such an assembly, the membrane may be placed between two electrodes, for example made of carbon fabric impregnated with a catalyst. The assembly is then pressed at an adequate temperature in order to obtain good electrode-membrane adhesion.

The electrode-membrane-electrode assembly obtained is then placed between two plates, which ensures electrical conduction and the feeding of reagents to the electrodes. These plates are commonly denoted as bipolar plates.

The invention will now be described with reference to the examples that follow, which are given as nonlimiting illustrations.

EXAMPLE 1

Synthesis of a sulfonated perfluoro polymer from poly-(4'-fluoro-2,5-benzophenone) and from the Sodium Salt of 4-hydroxybenzenesulfonic Acid (40% substitution)

The initial polymer poly(4'-fluoro-2,5-benzophenone) is prepared according to a method inspired from the publication by A. J. Pasquale et al. "Poly(p-phenylene)derivatives via Ni-catalyzed Coupling of Aromatic Dichlorides", Polymer Preprints, 1997, 38(1) 17 [6] and P. Bloom et al. "Functional Derivatives of Poly(4'-fluoro-2,5-diphenylsulfone) via nucleophilic aromatic substitution", Polymer Preprints, ACS, 1999, 40(2) 567 [7]. This polymer consists of a sequence of units:

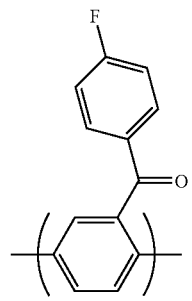

The sodium salt of the 4-hydroxybenzenesulfonic acid corresponding to the following formula:

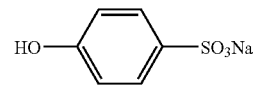

is used as precursor to functionalize the polymer, the structure of which is described above. The aim of this example is to obtain a copolymer comprising 40% of this arylsulfonated precursor.

A slight excess of potassium carbonate is added to a 100 mL three-necked flask equipped with Dean-Stark apparatus, a condenser, an argon inlet and a magnetic stirrer, predried under argon and placed under a stream of argon, followed by addition of 3 mL of dimethylacetamide and 30 mL of toluene by syringe. The flow of argon is maintained throughout the reaction. 0.2 g of the sodium salt of 4-hydroxybenzenesulfonic acid is introduced and this mixture is placed in an oil bath, preheated to 130° C., for 2 hours. 0.2 g of polymer dissolved in 3 mL of dimethylacetamide is then introduced. The oil bath is maintained at between 100 and 145° C. for about 24 hours. The polymer is precipitated in 150 mL of distilled water. The mixture is stirred overnight at room temperature and then filtered through a Buchner funnel. The yield is 75%. The structure of the sulfonated perfluoro copolymer is checked by infrared, NMR, DSC, ATG and elemental analysis.

After this preparation, a polymer consisting of a repeating unit (Ia) and of a repeating unit (IIa) is obtained.

The ion-exchange capacity of the copolymer obtained is equal to 1.5 meq H$^+$/g and the pKa=2.

EXAMPLE 2

Synthesis of a Sulfonated Perfluoro Polymer from Poly-(4-fluoro-2,5-benzophenone) and from the Sodium Salt of 4-hydroxybenzenesulfonic Acid (50% Substitution)

The same initial polymer as in example 1 and the same procedure are used. 0.3 g of the sodium salt of 4-hydroxybenzenesulfonic acid is added to obtain a copolymer comprising 50% of this arylsulfonated precursor. The yield is 76%. The structure of the sulfonated perfluoro copolymer is checked by FTIR, NMR, DSC, ATG and elemental analysis.

After this preparation, a polymer consisting of a repeating unit (Ia) and of a repeating unit (IIa) is obtained.

The ion-exchange capacity of the copolymer obtained is equal to 1.7 meq H$^+$/g and the pKa=2.3.

EXAMPLE 3

Synthesis of a Sulfonated Perfluoro Polymer from poly(4'-fluoro-2,5-benzophenone) and from the Sodium Salt of tetrafluoro-2-(tetrafluoro-2-(4-hydroxyphenoxy)ethoxy)tetrafluoroethanesulfonic Acid (40% Substitution)

The same initial polymer as in example 1 and the same procedure are used. In this case, 0.5 g of the sodium salt of tetrafluoro-2-(tetrafluoro-2-(4-hydroxyphenoxy)ethoxy)tetrafluoroethanesulfonic acid is added to obtain the intended copolymer comprising 40% of this arylsulfonated precursor, the structure of which is described below:

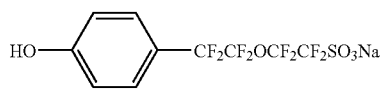

The yield is 60%. The structure of the sulfonated perfluoro copolymer is checked by FTIR, NMR, DSC, ATG and elemental analysis.

After this preparation, a polymer consisting of a repeating unit (Ib) and of a repeating unit (IIa) is obtained.

The ion-exchange capacity of the copolymer obtained is equal to 1.25 meq H$^+$/g and the pKa=−3.

EXAMPLE 4

The same initial polymer as in example 1 and the same procedure are used. In this case, 0.7 g of the sodium salt of tetrafluoro-2-(tetrafluoro-2-(4-hydroxyphenoxy)ethoxy)tetrafluoroethanesulfonic acid is added to obtain the intended copolymer comprising 80% of this arylsulfonated precursor, the structure of which is described below:

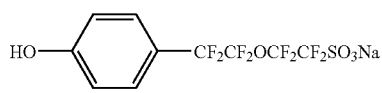

The yield is 50%. The structure of the sulfonated perfluoro copolymer is checked by FTIR, NMR, DSC, ATG and elemental analysis.

After this preparation, a polymer consisting of a repeating unit (Ib) and of a repeating unit (IIa) is obtained.

The ion-exchange capacity of the copolymer obtained is equal to 1.2 meq H$^+$/g and the pKa=−3.5.

REFERENCES CITED

[1] WO 94/24717;
[2] U.S. Pat. No. 5,668,245;
[3] EP-A-0 723 248;
[4] DE-A1-195 35 086;
[5] I. Colon and D. R. Kelsey, I. Org. Chem., 1986, 51, pp. 2627-2637;
[6] A. J. Pasquale et al., Polymer Preprints, 1997, 38(1) 17;
[7] P. Bloom et al., Polymer Preprints, ACS, 1999, 40(2) 567.

The invention claimed is:
1. A polymer, the skeleton of which consists of at least one phenylene repeating unit of formula (I) below:

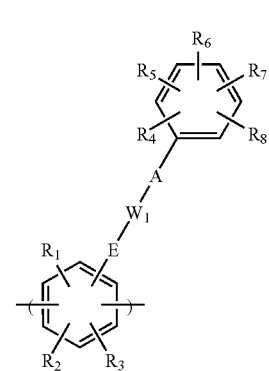

and of at least one phenylene repeating unit of formula (II) below:

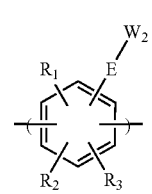

in which:
the groups $R_1$, $R_2$ and $R_3$, which may be identical or different, represent a hydrogen atom, a halogen atom, an alkyl group, an aryl group, a perfluoroalkyl group or a perfluoroaryl group;
the group E represents a single bond or a group chosen from —(C=O)—, —P(=O)— and —SO$_2$—;
the group $W_1$ represents an arylene group or a perfluoroarylene group;
the group A represents a group chosen from —O—, —S—, —NH— and —NR$_9$—, $R_9$ being an alkyl group;
the group $W_2$ represents an aryl group substituted with at least one substituent chosen from F, —O—SO$_2$-Aryl, —S(=O)-Aryl or represents a perfluoroaryl group;
the groups $R_4$, $R_5$, $R_6$, $R_7$ and $R_8$, which may be identical or different, represent a group chosen from:
  a hydrogen atom, a halogen atom, an —OH group, a group -M(R$_{10}$)$_3$ with $R_{10}$ representing an alkyl group and M a metal chosen from Si, Sn and Ge;
  a group —P(=O)(OR$_{11}$)$_2$ with $R_{11}$ representing an alkyl group;
  an aryl group, a group —O-Aryl, a group —SO$_2$-aryl, an alkylaryl group, a perfluoroalkyl group or a perfluoroalkylaryl group, said alkyl, perfluoroalkyl and perfluoroalkylaryl groups optionally comprising in their chain one or more oxygen, nitrogen and/or sulfur atoms;
  a perfluoroaryl group or a group —O-perfluoroaryl, said perfluoroalkyl, perfluoroaryl, perfluoroalkylaryl and —O-perfluoroaryl groups optionally bearing a group chosen from —SO$_3$H, —PO$_3$H$_2$ and —CO$_2$H;
  an —SO$_3$H group, a —PO$_3$H$_2$ group or a —CO$_2$H group;
on condition that at least one of the groups $R_4$, $R_5$, $R_6$, $R_7$ and $R_8$ represents a group chosen from —SO$_3$H, —PO$_3$H$_2$ and —CO$_2$H groups, perfluoroalkyl groups, perfluoroalkylaryl groups optionally comprising in their chain one or more oxygen, nitrogen and/or sulfur atoms, perfluoroaryl groups and —O-perfluoroaryl groups, these perfluoro groups bearing a group chosen from —SO$_3$H, —PO$_3$H$_2$ and —CO$_2$H, said —SO$_3$H, —PO$_3$H$_2$ and —CO$_2$H groups possibly being in the form of alkali metal salts.

2. The polymer as claimed in claim 1, the molecular weight of which is greater than or equal to 50 000.

3. The polymer as claimed in claim 1, in which the phenylene groups of the skeleton are in the para position relative to each other.

4. The polymer as claimed claim 1, which is a random, alternating or sequential polymer.

5. The polymer as claimed in claim 1, in which at least one of the groups R$_4$, R$_5$, R$_6$, R$_7$ and R$_8$ represents a perfluoroalkyl group, comprising in its chain one or more oxygen, nitrogen and/or sulfur atoms, said group bearing a group chosen from —SO$_3$H, —PO$_3$H$_2$ and —CO$_2$H or its alkali metal salts.

6. The polymer as claimed in claim 1, in which, for the repeating unit(s) of formula (I), at least one of the groups R$_4$, R$_5$, R$_6$, R$_7$ and R$_8$ represents a group chosen from —SO$_3$H, —PO$_3$H$_2$ and —CO$_2$H, and, for the unit(s) of formula (II), W$_2$ is an aryl group bearing a fluorine leaving group.

7. The polymer as claimed in claim 6, the skeleton of which consists of repeating units of formulae (Ia) and (IIa) below:

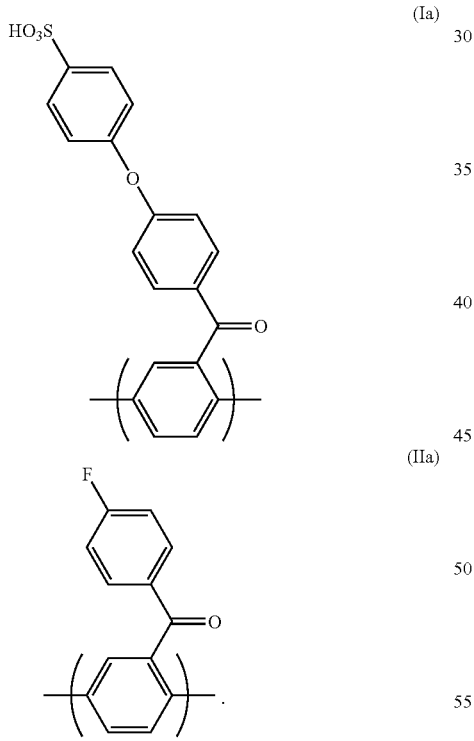

8. The polymer as claimed in claim 1, in which, for the repeating unit(s) of formula (I), at least one of the groups R$_4$, R$_5$, R$_6$, R$_7$ and R$_8$ represents a perfluoroalkyl group chosen from the groups having the following formulae:

—(CF$_2$)$_n$—O—(CF$_2$)$_n$—SO$_3$H,     —(CF$_2$)$_n$—SO$_3$H,
—O—(CF$_2$)$_n$—SO$_3$H,    —O—(CF$_2$)$_n$—O—(CF$_2$)$_n$—SO$_3$H, n ranging from 1 to 10, and, for the repeating unit(s) of formula (II), W$_2$ represents an aryl group bearing a fluorine atom.

9. The polymer as claimed in claim 8, the skeleton of which consists of repeating units of formulae (Ib) and (IIa) below:

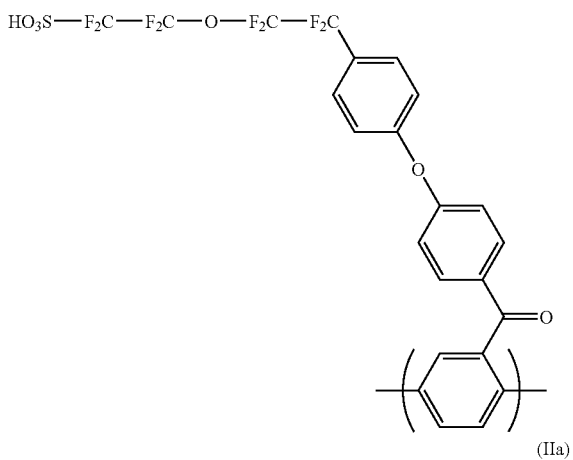

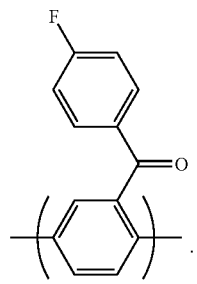

10. A process for preparing a polymer as claimed in claim 1 comprising the reaction of a base polymer whose skeleton consists of at least one repeating unit of formula (II) below:

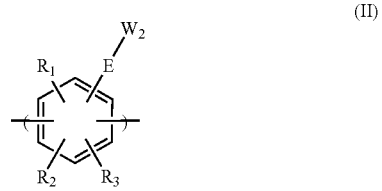

in which R$_1$, R$_2$, R$_3$, E and W$_2$ correspond to the same definition as that given in claim 1, with at least one compound of formula (III) below:

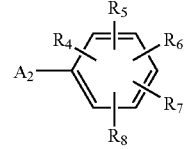

in which R$_4$, R$_5$, R$_6$, R$_7$ and R$_8$ are as defined in claim 1, the group A$_2$ is an OH, —SH, NH$_2$ or —NHR group with R corresponding to the same definition as R$_9$ of claim 1, said group A$_2$ being capable of effecting the aromatic nucleophilic substitution of a group borne by W$_2$, a remaining group after the nucleophilic substitution being —W1-A-, W1 and A corresponding to the same definition as A of claim 1.

11. A membrane comprising the polymer as claimed in claim 1.

12. A fuel cell device comprising at least one membrane as claimed in claim 11.

13. The polymer as claimed in claim 1, the molecular weight of which is from 50 000 to 150 000.

14. The process as claimed in claim 10, wherein the group borne by $W_2$ is an F, —O—$SO_2$-Aryl or —S(=O)-Aryl group.

* * * * *